United States Patent

[11] 3,603,621

| [72] | Inventor | Frederick L. Parsons |
| | | 759 Morningside Rd., Ridgewood, N.J. 07450 |
| [21] | Appl. No. | 869,613 |
| [22] | Filed | Oct. 27, 1969 |
| [45] | Patented | Sept. 7, 1971 |

[54] HOSE COUPLING
3 Claims, 5 Drawing Figs.

[52] U.S. Cl. .................................................... 285/319,
285/174, 285/DIG. 22
[51] Int. Cl. ..................................................... F16l 37/00
[50] Field of Search .......................................... 285/319,
317, 240, DIG. 21, 174

[56] References Cited
UNITED STATES PATENTS

| 160,301 | 3/1875 | Brancher et al. ............... | 285/319 |
| 764,395 | 7/1904 | Sweed et al. .................. | 285/319 X |
| 1,284,358 | 11/1918 | Kelley .......................... | 285/319 |

Primary Examiner—Reinaldo P. Machado
Assistant Examiner—David H. Corbin
Attorney—Brumbaugh, Graves, Donohue & Raymond ABSTRACT: A quick locking and releasing coupling for a pair of members to be coupled together including resilient coupling means projecting from each member to be coupled and snap-locking with the other member to be coupled and a raised cam engageable with the resilient coupling means when they are twisted or rotated relatively to each other to spread the resilient coupling means and release the member with which it was locked.

PATENTED SEP 7 1971

3,603,621

INVENTOR.
FREDERICK L. PARSONS

BY Brumbaugh, Graves, Donohue & Raymond his ATTORNEYS

HOSE COUPLING

This invention relates to a novel coupling in which a pair of elements can be tightly locked together by forcing them into snap-locked relation and quickly released by twisting or rotating the elements relative to each other through a fraction of a revolution.

The novel coupling of the present invention has a more general application, but one application for which it is particularly suited is for use as a hose coupling. The conventional hose coupling consists of an internally threaded member and an externally threaded member which are coupled together by first aligning the threads for engagement and then screwing the coupling members through at least several complete revolutions until a sealed connection is achieved. The coupling members must be unscrewed through several revolutions to uncouple them.

The novel coupling of the present invention embodies a simple and unique structure which permits a pair of members to be quickly locked together and quickly released. Toward this end each of the members to be coupled together has a resilient coupling means projecting from it which snap-locks with a part of the other member and a raised cam for spreading apart the resilient coupling means when they are rotated or twisted relative to each other to disengage them from the members with which they were interlocked. Thus, the coupling of the present invention can be quickly locked in a snap fit by forcing the respective resilient coupling means into interlocking relationship with the members to be coupled and quickly released by twisting them through a partial revolution relative to each other and then separating them.

For a complete understanding of the present invention, reference can be made to the detailed description which follows and to the accompanying drawings in which.

Figure 1:
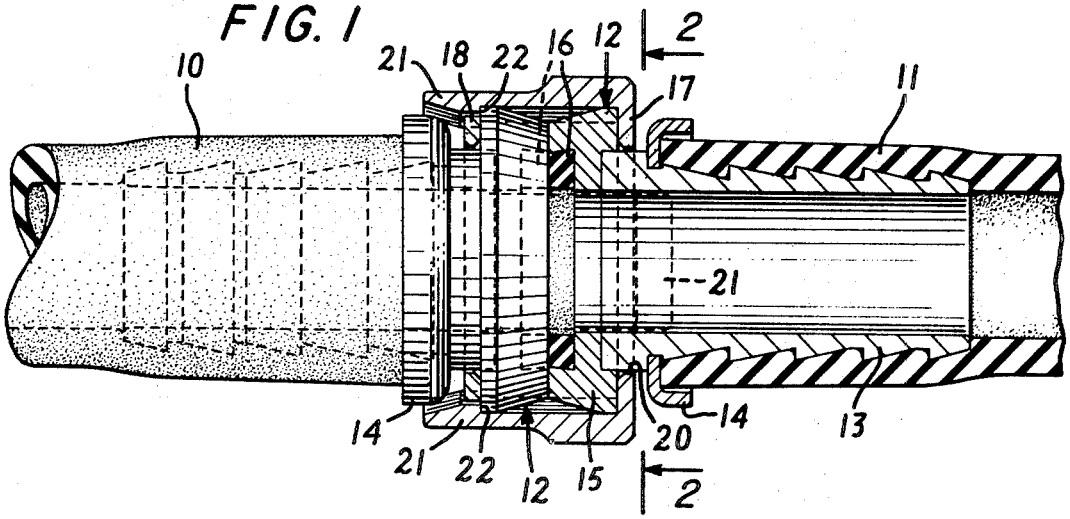
FIG. 1 is a view partly in cross section of the novel coupling of the present invention.

The coupling of the present invention is shown in the drawings as a coupling for connecting together the ends of a pair of hoses 10 and 11. The ends of the hoses 10 and 11 are each equipped with an annular coupling member 12 which includes a tubular portion 13 force fitted into the end of the hose, a sleeve 14 engaging the end of the hose and a collar 15 containing a sealing ring 16 which is adapted to be locked together with a similar collar in face-to-face relation on a common axis to couple the hoses together.

Figure 5:
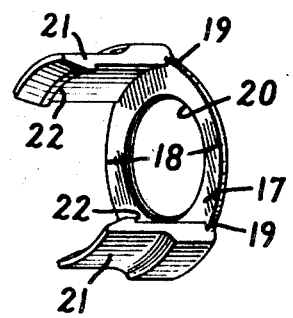
FIG. 5 is a perspective view of one of the coupling elements of the present invention.

Each coupling member accommodates thereon between the sleeve 14 and the collar 15 a coupling element of the configuration shown in FIG. 5 of the drawing. This coupling element is integrally formed of resilient spring steel or other resilient spring material and includes a platelike cam 17 having a pair of oppositely disposed lower cam edges 18 and a pair of oppositely disposed raised cam edges 19, a centrally located opening 20 which permits it to be accommodated on the tubular portion 13 of the coupling member and a pair of oppositely disposed resilient gripping fingers 21 projecting laterally from the raised portions of one side of the cam 17. The gripping fingers 21 each have an inner shoulder 22 which interlocks with the rear edge of the collar 15 of the opposite coupling member.

When the coupling element is mounted on its respective coupling member the cam 17 is immediately behind the respective collar 15 and the gripping fingers 21 project laterally beyond the respective collar and grip between them the collar of the opposite coupling member. The lower cam edges 18 of each coupling element are recessed below the outer periphery of the collar 15 and the higher cam edges 19 extend at least to the outer periphery of the collar and preferably outwardly of the collar.

When the couplings are to be locked together the coupling elements are oriented at right angles to each other forced together until the shoulders 22 snap into locking relation with the rear edges of the opposite collars 15. When the coupling elements are oriented at right angles to each other, the shoulders of the gripping fingers will be free to engage and interlock with the portion of the opposite collar due to the fact that the gripping fingers are oriented with the lower cam edges of the opposite coupling element. The coupling elements hold the collars tightly together with the sealing rings 16 in sealing relationship.

Figure 2:
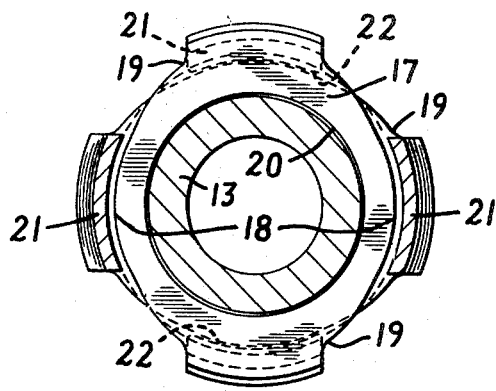
FIG. 2 is a view taken along the line 2—2 of FIG. 1 looking in the direction of the arrows and showing the coupling in locked condition.
Figure 3:
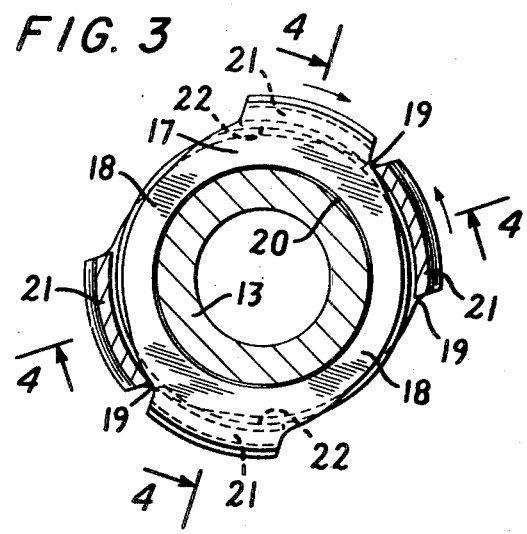
FIG. 3 is a view similar to FIG. 2 with the parts displaced to their release positions.
Figure 4:
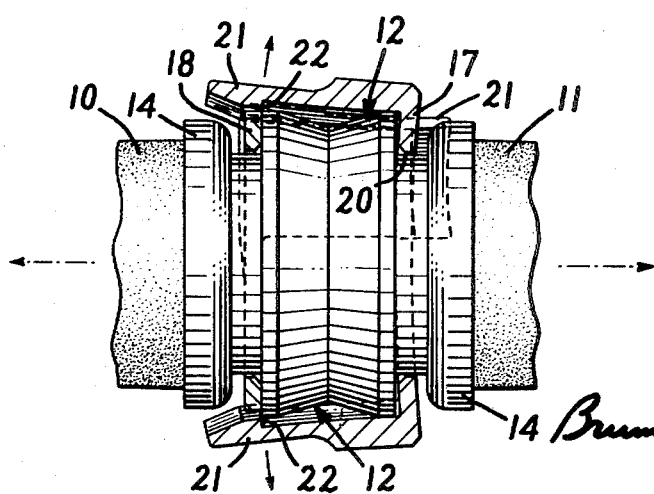
FIG. 4 is a view taken along either of the lines 4—4 of FIG. 3 looking in the direction of the arrows.

The coupling elements are readily disengaged from each other by twisting the coupling elements about their common axis from the perpendicular positions shown in FIG. 2 to the relative positions shown in FIG. 3, thereby bringing the gripping fingers into engagement with the raised cam edges 19 and spreading the fingers apart as shown in FIG. 5. With the fingers thus spread apart, the coupling elements are ready separated.

The invention has been shown in a single preferred form and by way of example only and various modifications and variations may be made therein without departing from the spirit of the invention. For example, the coupling elements can be made integrally with the respective collars. The invention, therefore, should not be limited to any particular form or embodiment except insofar as such limitations are expressly set forth in the claims.

I claim:

1. A quick locking and releasing coupling for a pair of members to be coupled together comprising resilient coupling means projecting from each of the members to be coupled and snap-locking with the other member to be coupled and a raised cam engageable with the resilient coupling means when the resilient coupling means are rotated relatively to each other to spread the resilient coupling means and disengage them from the members with which they were locked, the cam and resilient coupling means associated with each member to be coupled being integral parts of an element which includes a platelike portion made of resilient spring material and having an outer periphery which includes at least two opposite recessed cam edges, two opposite raised cam edges and a pair of oppositely disposed gripping fingers extending laterally from one side of said raised cam edges.

2. A quick locking and releasing coupling for a pair of members to be coupled together comprising resilient coupling means projecting from each of the members to be coupled and snap-locking with the other member to be coupled and a raised cam engageable with the resilient coupling means when the resilient coupling means are rotated relatively to each other to spread the resilient coupling means and disengage them from the members with which they were locked, the cam and resilient coupling means associated with each member being integral parts of an element which includes an annular cam made of resilient material and having opposite cam edges recessed below a part of the outer periphery of the member with which it is associated, a pair of opposite raised cam edges which extend at least to the outer periphery of said member, and a pair of oppositely disposed grippers which extend laterally from the raised cam edges to receive between them the outer periphery of part of the said member and to interlock therewith at the recessed cam edges of the coupling associated with said other member, the relative rotation of the couplings bringing the gripping means of each coupling member into engagement with the raised cam edges of the opposite coupling member to spread apart the grippers and disengage them from the members with which they have been interlocked.

3. A quick locking and releasing coupling for a pair of members to be coupled together comprising resilient coupling means projecting from each of the members to be coupled and snap-locking with the other member to be coupled and a raised cam engageable with the resilient coupling means when the resilient coupling means are rotated relatively to each other to spread the resilient coupling means and disengage them from the members with which they were locked, the cam including a pair of opposite cam edges recessed below the outer periphery of the member with which it is associated and a pair of opposite raised cam edges extending at least to the outer periphery of said member and the resilient coupling means including a pair of oppositely disposed locking fingers which extend laterally from one member to be coupled to interlock with the other member to be coupled at said recessed cam edges, the relative rotation of the cam associated with one member and the locking fingers associated with the other member bringing the locking fingers into engagement with the raised cam edges to spread apart the fingers to release the member thereby engaged, the said cam and pair of oppositely disposed locking fingers associated with each of the members to be coupled consist of a one piece resilient spring member.